United States Patent [19]

Stanley

[11] 4,368,123

[45] * Jan. 11, 1983

[54] REGENERATIVE COUNTER TOP WATER CONDITIONER

[76] Inventor: Bedford F. Stanley, 4901 E. Sunrise Dr., No. 1614, Tucson, Ariz. 85718

[*] Notice: The portion of the term of this patent subsequent to Sep. 1, 1998, has been disclaimed.

[21] Appl. No.: 298,231

[22] Filed: Aug. 31, 1981

[51] Int. Cl.$^3$ .............................................. C02F 1/42
[52] U.S. Cl. .................................. 210/269; 210/282; 210/289; 210/290; 210/293
[58] Field of Search .............. 210/670, 672, 678, 687, 210/269, 275, 282, 287, 290, 293, 289

[56] References Cited

U.S. PATENT DOCUMENTS

| | | | |
|---|---|---|---|
| 2,052,515 | 8/1936 | Pick | 210/687 |
| 2,529,398 | 11/1950 | Krieck | 210/282 |
| 2,605,901 | 8/1952 | Morrison | 210/282 |
| 3,058,816 | 10/1962 | Rudelick | 210/269 |
| 3,245,537 | 4/1966 | Burgess | 210/85 |
| 3,439,809 | 4/1969 | McPherren | 210/282 |
| 3,960,721 | 6/1976 | Heskett | 210/678 |
| 4,116,860 | 9/1978 | Kunin | 210/670 |
| 4,151,079 | 4/1979 | Horembala | 210/672 |
| 4,287,057 | 9/1981 | Stanley | 210/282 |
| 4,305,826 | 12/1981 | Moses | 210/687 |

FOREIGN PATENT DOCUMENTS 906243 9/1962 United Kingdom ................ 210/678

*Primary Examiner*—Ernest G. Therkorn
*Attorney, Agent, or Firm*—Cahill, Sutton & Thomas

[57] ABSTRACT

A bed of silver activated charcoal in combination with a downstream bed of a mixture of anion exchange resins and cation exchange resins aerate, purify, soften and dealkalize water flowing therethrough. Periodic flushing through a unit having a solution of sodium chloride or potassium chloride regenerates both exchange resins. An upright cylindrical container having screen separated compartments for the chemicals and filters receives tap water from a pressure reducing nozzle and discharges the conditioned water through a spigot. The unit containing the chemical regenerant is selectively connectable intermediate the nozzle and the container.

5 Claims, 3 Drawing Figures

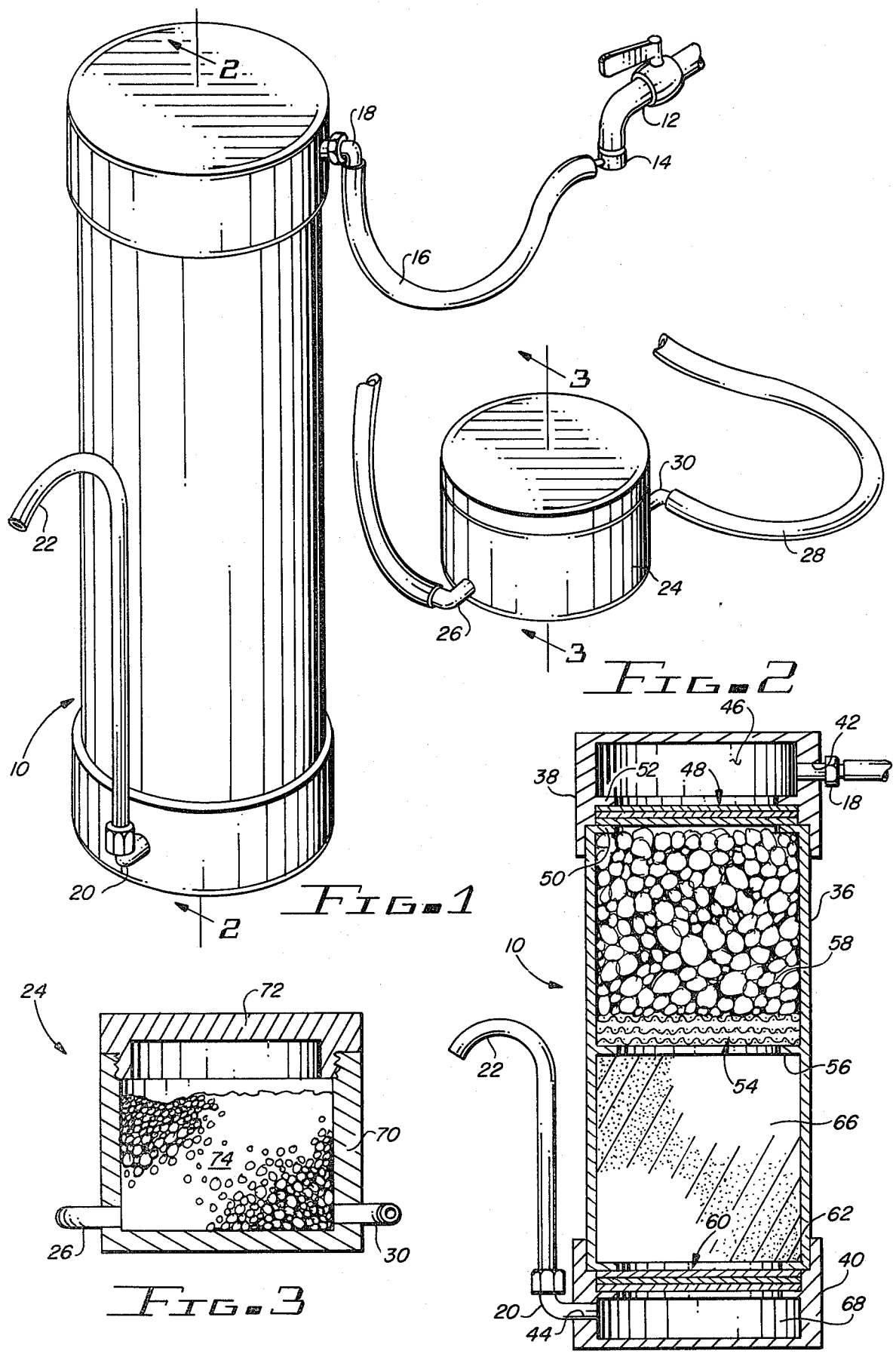

REGENERATIVE COUNTER TOP WATER CONDITIONER

The present application describes an invention related to apparatus invented by the present inventor and described in a patent application entitled "PORTABLE SINK TOP WATER CONDITIONER", Ser. No. 183,320 filed Sept. 2, 1980, now U.S. Pat. No. 4,287,057.

The present invention relates to water conditioners and, more particularly, to counter top regenerative water conditioners.

In many metropolitan and rural areas, the tap water available is hard and alkaline. Such water has an unpleasant taste to many people and is detrimental to the flavor of food and drink prepared therewith. A solution to the problem is that of interconnecting a water conditioning unit to the water supply of the dwelling itself. Such a water conditioning unit is expensive to purchase or rent and incurs not insignificant monthly operating costs for conditioning both ingested water and water for all other purposes.

As much of the water used in a residence is not for direct consumption by the occupants, a lot of the water is unnecessarily conditioned and brings about unnecessary expenses. To reduce water conditioning expenses to the water taken internally by the occupants, the apparatus described in the above referenced copending application was conceived and reduced to practice.

Any water conditioning apparatus must be periodically purged of the impurities extracted from the water. Such purging is usually performed by backflushing the conditioner and which backflushing is generally messy, time consuming and an irritation; moreover, the degree of effectiveness of backflushing is often not immediately known and either underflushing or overflushing may often occur.

The present invention is directed to a compact water conditioner connectable to a source of tap water within a dwelling for conditioning water to be consumed as a fluid or as an ingredient of food to be prepared. The water conditioning compounds, aside from the silver actuated charcoal, include a quantity of anion exchange resins and cation exchange resins, either segregably located serially in the water flow or mixed essentially in equal proportions. These resins both soften and dealkalize the water flowing therethrough. Regeneration of both resins is effected by a solution of sodium chloride or potassium chloride flowing therethrough for a limited time period followed by a flushing of the regenerant. The regeneration step is accomplished by simply placing upstream and in line with the conditioner a unit which will discharge the regenerant to regenerate the anion and cation exchange resins. By utilizing a pressure reducing nozzle at the tap water input to the conditioner to reduce the pressure therein to a range of approximately two pounds per square inch, the conditioner may be built of relatively inexpensive plastic materials and fittings while still providing a sufficient flow rate for most domestic purposes.

It is therefore a primary object of the present invention to provide a regenerative water conditioner for household use.

Another object of the present invention is to provide an inexpensive regenerative water conditioner for drinking water.

Still another object of the present invention is to provide a water conditioner which may be regenerated with the use of inexpensive regenerant chemicals.

Yet another object of the present invention is to provide a disconnectable regenerating unit for household counter top water conditioners.

A further object of the present invention is to provide a self-contained water conditioner of small size and lightweight to provide softened dealkalized drinking water.

A still further object of the present invention is to provide a simple and compact water conditioner for household use.

A yet further object of the present invention is to provide an easy to use household water conditioner.

These and other objects of the present invention will become apparent to those skilled in the art as the description thereof proceeds.

The present invention may be described with greater specificity and clarity with reference to the following drawings, in which:

FIG. 1 is a perspective view of components of the water conditioner apparatus;

FIG. 2 is a cross-sectional view taken along lines 2—2, as shown in FIG. 1; and

FIG. 3 is a cross-sectional view taken along lines 3—3, as shown in FIG. 1.

Referring to FIG. 1, there is shown a container 10 which performs the function of conditioning the water flowing thereinto. The water to be conditioned is introduced from a conventional household water tap 12 through a pressure reducing nozzle 14. The nozzle is connected by flexible tubing 16 or the like to inlet pipe 18. An outlet pipe 20 supports a vertically extending spigot or discharge pipe 22.

Flow through the water conditioner is brought about by simply opening tap 12 which results in flow through container 10 and discharge of the conditioned water from discharge pipe 22. In one embodiment of the apparatus, container 10 has a diameter of three inches and an overall height of approximately seventeen inches. Accordingly, it is sufficiently compact to be placed upright upon the counter top in most kitchens, in bathrooms or other locations within a residence or office where conditioned drinking water is desired.

As with most water conditioning apparatus, the conditioning is performed by a chemical action. The active chemicals degenerate through use and must either be replaced or else regeneration of the chemicals must be performed. The present invention is directed to the latter category.

To regenerate the chemicals within container 10, a unit 24 housing the regenerating compound is connected in line between nozzle 14 and inlet pipe 18. This interconnection is shown representatively in FIG. 1. Typically, tubing 16 may be disconnected from nozzle 14 and reconnected to outlet 26; a further length of tubing 28 interconnects inlet 30 with nozzle 14.

In operation, opening tap 12, after unit 24 has been connected in line, results in flushing of the chemicals within container 10 with the regenerating compound initially placed within unit 24 and conveyed therefrom by the water flow. Thus, regeneration is extremely simple and easily performed by any member of a household with only minimal instruction.

From the above description, various possibilities of use of the present invention may come to mind. In example, travelers can readily carry container 10, with or without a regenerative unit 24 on trips to locations or foreign countries wherein bad tasting water is the norm. Moreover, smaller portable units can readily be made for use by hikers and others who may otherwise be forced to drink hard alkaline water.

Turning to FIG. 2, the internal construction and components of container 12 will be described. The container may be formed of a cylinder 36 of inexpensive plastic or the like. A top cap 38 and a bottom cap 40, which may also be of inexpensive plastic, are fitted thereon. The top cap includes an aperture 42 for penetrably receiving and retaining inlet pipe 18. Similarly, bottom cap 40 includes an aperture 44 for receivingly retaining outlet pipe 20. An inlet compartment 46 is formed intermediate the end of top cap 38 and screen/filter set 48. The screen/filter set may include a 200 mesh stainless steel filter sandwiched between a pair of plastic disc screens. It is maintained in place intermediate a cylinder supported interior annular ring 50 and a top cap supported interior annular ring 52. Independent or screen/filter set attached seals are employed to prevent leakage about the perimeter of the screen/filter set or intermediate the end cap and connected end of cylinder 36. A plurality of screens 54 are disposed interior of cylinder 36 and supported upon an interior annular ring 56 or the like. The space intermediate screen/filter set 48 and screens 54 defines a first compartment 58. A screen/filter set 60 is disposed at the lower end of cylinder 36 and retained in place by interior annular ring 62 extending interior of the cylinder and a further annular ring 64 extending from bottom cap 40. Suitable seal means may be employed to prevent flow adjacent the perimeter of screen/filter set 60 and/or between the cylinder and the bottom cap. A second compartment 66 is defined by screens 54 and screen/filter set 60. An outlet compartment 68 is formed intermediate screen/filter set 60 and the end of bottom cap 40.

Inlet compartment 46 serves the purpose of collecting, without clogging, any water entrained foreign substances not passable through the filter of screen/filter set 48, the filter of which is preferably of 200 mesh. Silver activated carbon is disposed within first compartment 58 and serves its well known purposes. The water conditioning compounds are disposed within second compartment 66. These compounds include a cation synthetic resin and an anion synthetic resin mixed in equal amounts which soften and dealkalize, respectively, the water.

It is to be understood that under some circumstances it may be preferable not to mix the cation synthetic resin and the anion synthetic resin; under such circumstances, second compartment 66 may be divided into two compartments separated by screens, one of which compartments houses each resin.

Regeneration of the cation and anion synthetic resins can be effected by flushing them with a solution of sodium chloride or potassium chloride. Such flushing is effected by interconnecting unit 24 between tap 12 and inlet pipe 18. Unit 24, as shown in FIG. 3, may be a simple jar 70 having a detachably attached cap 72. Outlet 26 and inlet 30 are penetrably mounted in the walls of the jar to inject and discharge fluid flow. Prior to regeneration, sodium chloride or potassium chloride, which may be in an amount of 2,000 grains for the size of container 10 described above, is placed within the jar.

In operation, regeneration of the cation and anion synthetic resins is effected by interconnecting unit 24 as shown in FIG. 1. As water flows through unit 24, the regenerating compound will be conveyed and interspersed throughout container 10, which interspersal performs a chemical regenerative action upon the cation and anion synthetic resins. After complete interspersal, the water flow is turned off and container 10 is allowed to sit for twenty to thirty minutes. Thereafter, fresh water is flushed through container 10 until all taste of the sodium chloride or potassium chloride is gone. The cation and anion synthetic resins have now been regenerated and the water conditioner is ready for further use.

The effectiveness of the present invention is set forth in a test report prepared by Smith & Smith Environmental Laboratory of Flagstaff, Ariz.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. A regenerative portable water conditioner for counter top use, said water conditioner comprising in combination:
    (a) a container having an inlet pipe for receiving water to be conditioned, a pressure reducing nozzle connectable to a conventional faucet and flexible tubing interconnecting said nozzle with said inlet pipe and a discharge pipe for discharging conditioned water; and a spigot for directly discharging the conditioned water into a vessel for immediate use;
    (b) an inlet compartment for receiving water from said inlet pipe, said inlet compartment being defined by a top cap;
    (c) a first compartment downstream of said inlet compartment, said first compartment including a quantity of activated charcoal;
    (d) filter means disposed intermediate said top cap and said first compartment for filtering the water flowing into said first compartment;
    (e) a second compartment downstream of said first compartment;
    (f) a cylinder for defining the walls of said first and second compartments, said cylinder having one end sealingly connected to said top cap;
    (g) a quantity of regenerative anion exchange resins and a quantity of regenerative cation exchange resins disposed within said second compartment for softening and dealkalizing the water flowing through said second compartment;
    (h) first screen means for segregating said first and second compartments;
    (i) an outlet compartment for receiving the water from said second compartment and directing the water to said discharge pipe said outlet compartment being defined by a bottom cap sealingly connected to another end of said cylinder; and
    (j) second screen means for segregating said second compartment from said outlet compartment.

2. A water conditioner as set forth in claim 1 including a unit for regenerating said anion and cation exchange resins, said unit including means for selectively inserting said unit intermediate said inlet pipe and the faucet.

3. A water conditioner as set forth in claim 2 wherein said unit comprises a jar for receiving the regenerant compound, a lid and an inlet and an outlet extending from said jar for conveying water into and out of said unit.

4. A water conditioner as set forth in claim 1 wherein the diameter of said cylinder is nominally three inches and the overall height of said cylinder and top and bottom caps is nominally 17 inches.

5. A water conditioner as set forth in claim 4 wherein said cylinder and said top and bottom caps are of plastic.

* * * * *